United States Patent [19]
Björklund et al.

[11] Patent Number: 5,163,787
[45] Date of Patent: Nov. 17, 1992

[54] APPARATUS FOR PNEUMATIC TRANSPORTATION OF A PARTICLE MATERIAL

[75] Inventors: Jan-Peter Björklund; Jacob Fellman, both of Parainen; Pentti Aalto, Hollola, all of Finland

[73] Assignee: Oy Partek AB, Parainen, Finland

[21] Appl. No.: 720,524

[22] PCT Filed: Apr. 1, 1990

[86] PCT No.: PCT/FI90/00005
§ 371 Date: Jun. 18, 1991
§ 102(e) Date: Jun. 18, 1991

[87] PCT Pub. No.: WO90/07463
PCT Pub. Date: Jul. 12, 1990

[30] Foreign Application Priority Data
Jan. 4, 1989 [FI] Finland .................. 890036

[51] Int. Cl.⁵ ................ B65G 53/54; B65G 53/16; B65G 53/18
[52] U.S. Cl. ........................ 406/89; 406/86; 406/196
[58] Field of Search ............ 406/89, 86, 88, 94, 406/95, 196, 194

[56] References Cited

U.S. PATENT DOCUMENTS

| | | |
|---|---|---|
| 2,882,097 | 4/1959 | Hamren .................. 406/88 |
| 3,253,865 | 5/1966 | Kanics .................. 406/89 X |
| 4,220,425 | 9/1980 | Jacobsen .................. 406/86 |
| 4,220,426 | 9/1980 | Ply .................. 406/89 |
| 4,575,284 | 3/1986 | Kelm .................. 407/87 |

FOREIGN PATENT DOCUMENTS

| | | |
|---|---|---|
| 674707 | 11/1963 | Canada .................. 406/89 |
| 1269571 | 5/1968 | Fed. Rep. of Germany . |
| 1431672 | 4/1970 | Fed. Rep. of Germany . |
| 1400988 | 6/1988 | U.S.S.R. .................. 406/88 |
| 1101052 | 1/1968 | United Kingdom .................. 406/89 |
| 1113755 | 5/1968 | United Kingdom .................. 406/89 |
| 9007463 | 7/1990 | World Int. Prop. O. .......... 406/196 |

OTHER PUBLICATIONS

Derwent's Abst. N8171E/42 (Krama).
Abst. of Japan vol. 7 No. 250 (M-254) (Denka).

Primary Examiner—Margaret A. Focarino
Assistant Examiner—James M. Kannofsky
Attorney, Agent, or Firm—Flehr, Hohbach, Test, Albritton & Herbert

[57] ABSTRACT

This invention relates to an apparatus for transporting particularly a powdery material for example from a silo after discharge. The apparatus comprises a flexible hose (1) the inside of which is provided with members (2) for fluidizing the material to be transported. These members are formed in the longitudinal direction of the hose as elements (3) functioning independently of one another.

1 Claim, 2 Drawing Sheets

APPARATUS FOR PNEUMATIC TRANSPORTATION OF A PARTICLE MATERIAL

This invention relates to an apparatus for the transportation of a particle material. Different more or less powdery materials, which are often stored in silos, are primarily concerned. For example, when the material is discharged from a silo, it is often necessary to transport it also horizontally, to the back of a lorry etc.

So far conveying screws have been mainly used for such transportation of a material. The disadvantages of conveying screws are the difficulty of cleaning in changing the material to be transported and their stiffness as well as the liability to wear and the frequent need of maintenance due to the wear.

The object of the invention is to provide a new and better apparatus for transporting a mass-like particle material.

The apparatus according to the invention is mainly characterized in that it comprises a flexible hose, on the inside of which members have been arranged for fluidizing the material to be transported, and that said members have been formed along the hose as elements functioning independently of one another.

The flexible hose is preferably made of rubber, plastic or a corresponding material, in which case the hose can be supplied as a bulk article, and the user can cut therefrom a length needed in a particular case.

By virtue of the flexible hose and the fluidization members arranged therein, the material can be transported in a controlled manner along a curvy line even in narrow passages irrespective of the prevailing conditions and without dust formation or loss of material. On account of the flexibility of the hose, the solution is economical when process changes occur because changes in the transportation routes of the material and the passing, or circling, of other devices can be easily effected as the hose does not need any solid foundations or the like. The hose functions also well no matter what position the cross-section is turned to. If the hose is even slightly descending in the transportation direction, the force of gravity is sufficient to transport the fluidized material. Several hoses can well be arranged in succession, whereby the apparatus can be used to transport the material even long distances.

Owing to the fact that the fluidization members are formed as elements functioning independently of one another in the longitudinal direction of the hose, the transportation of the material along the hose can take place without interruption even if temporary interruptions should take place in the supply of the material.

The members for fluidizing the material to be transported comprise preferably a gas-permeable lining at least partly covering the inner surface of the hose, whereby the spaces between the hose and lining are formed into separate sections in the longitudinal direction of the hose, and throttled feed of gas is arranged for each section, whereby longitudinal channels or tubes which open into said separate sections through throttle apertures are formed in the wall or on the surface of the hose for feeding gas to the separate sections.

Suitable dimensioning of the throttle apertures between the longitudinal channels in the wall of the hose and the sections within the hose helps to achieve the fact that the compressed air in the channel cannot escape from the side of the hose which is not covered with the material to be transported.

Alternatively, the members for fluidizing the material to be transported can preferably comprise a gas feeding tube disposed on the bottom of the hose and provided with throttle apertures, said tube being surrounded by a gas-permeable cloth or the like attached at least substantially tightly to the tube at regular intervals.

In the following, the invention will be described by means of the embodiments disclosed in the attached drawings.

Figure 1:
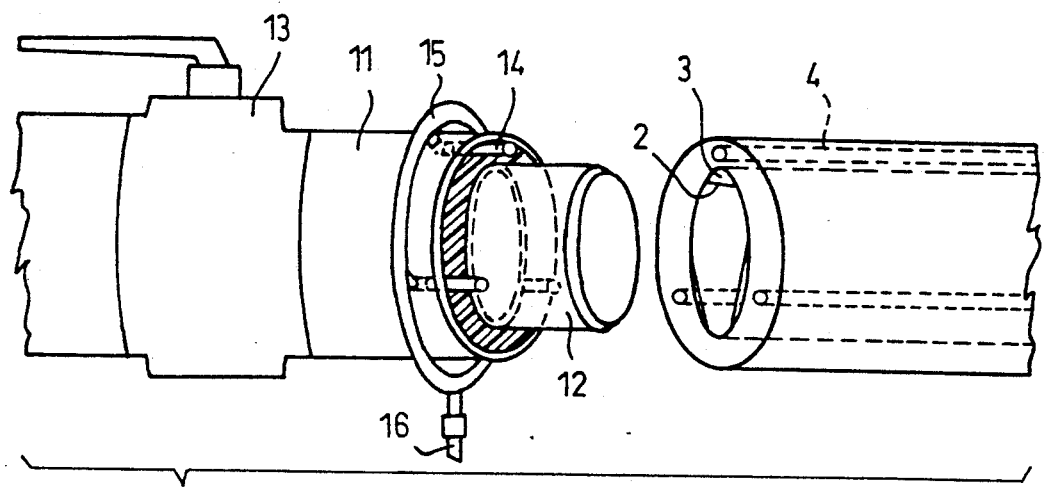
FIG. 1 shows a first embodiment of the invention seen substantially from the side.
Figure 2:
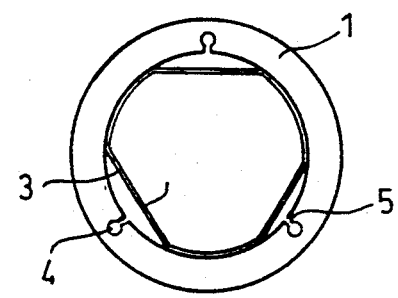
FIGS. 2 and 3 show a cross-section and a longitudinal section respectively of the hose according to FIG. 1.
Figure 3:
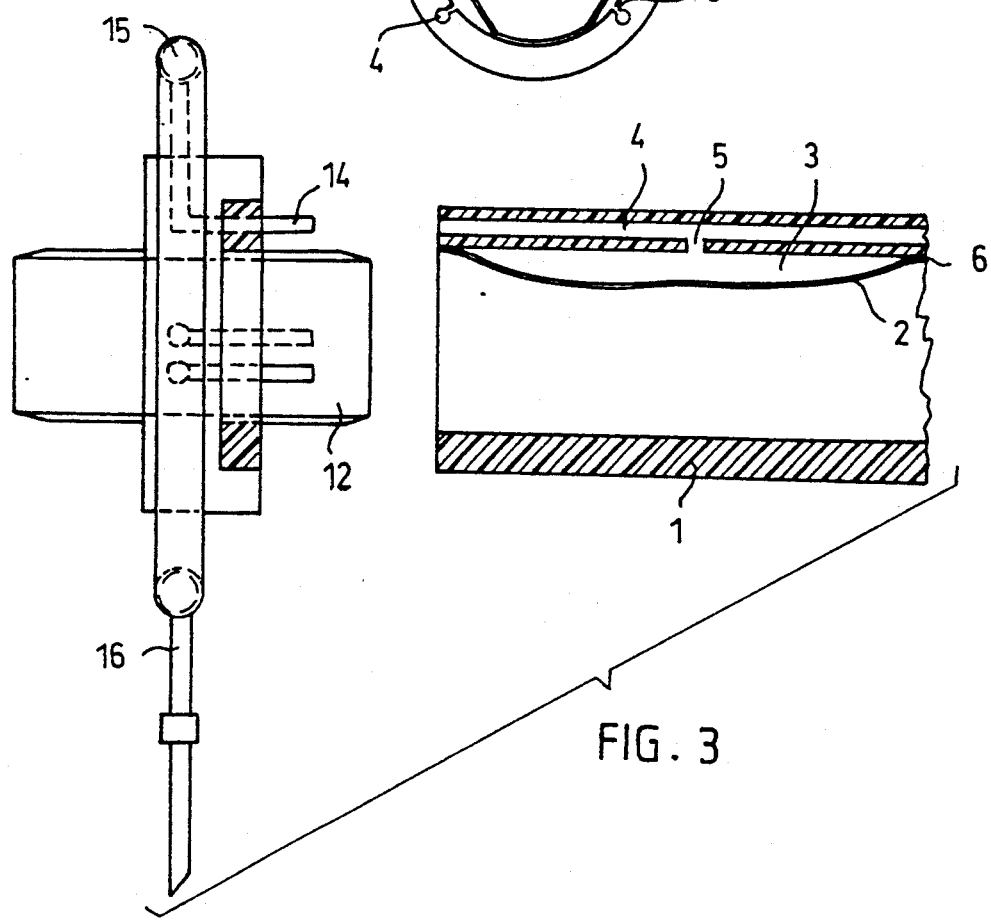

In FIGS. 1 to 3 the reference numeral 1 denotes a hose for conveying a material, which hose is preferably made of rubber, plastic or a corresponding material. The inner surface of the hose 1 is covered with a gas-permeable lining 2 in such a manner, for example, that three longitudinal fluidization channels 3 are formed between the inner surface of the hose 1 and the lining 2 at regular intervals round the circuit of the hose. Each channel 3 is divided in different sections in the longitudinal direction by means of transverse walls 6 in FIG. 3.

A longitudinal gas feeding channel 4, which opens into each separate section of the fluidization channel 3 through a throttle aperture 5, is formed in the wall of the hose at each channel 3. Since all the different sections of the fluidization channels 3 have their own throttled feed of gas, gas cannot "escape" even if there should not be any material to be transported immediately within some section of the lining 2.

The reference numeral 11 denotes a connection e.g. to the discharge opening of a silo, 12 denotes a connecting stub to be pushed into the hose 1, and 13 denotes a stop valve. The fluidization gas is fed from a pipe 16 through a ring channel 15 to nozzles 14, which can be pushed into wall channels 4 of the hose 1.

Figure 4:
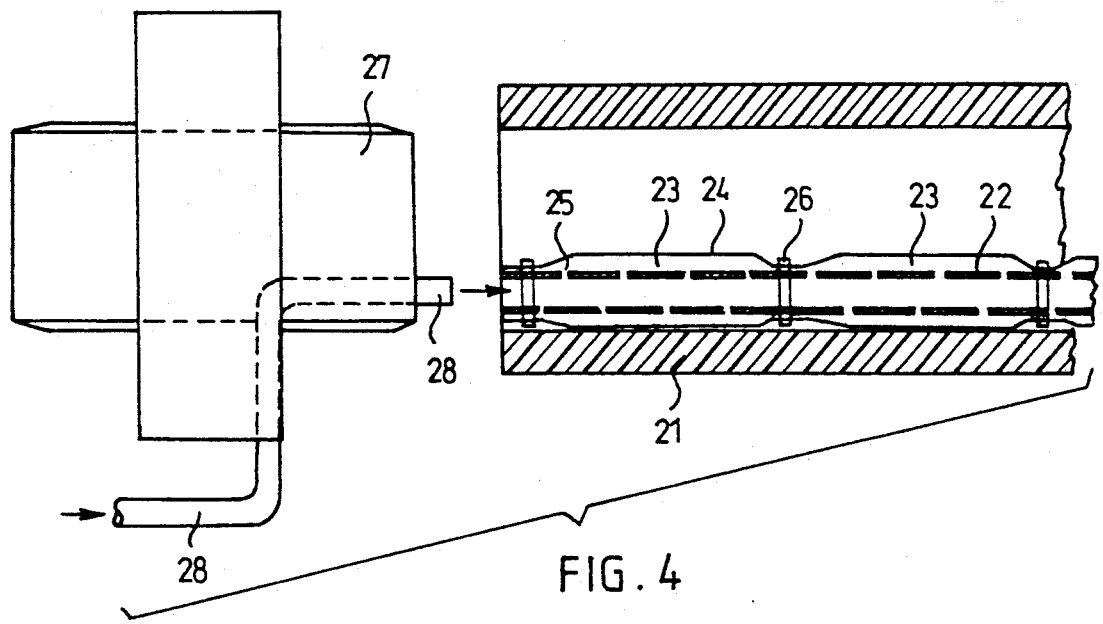
FIGS. 4 and 5 show a longitudinal section and a cross-section respectively of the hose according to a second embodiment.
Figure 5:
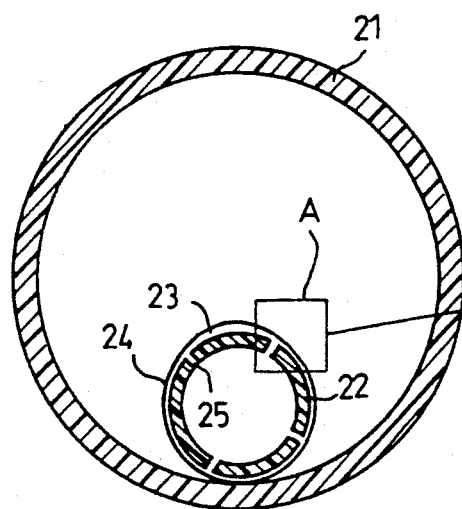
Figure 6:
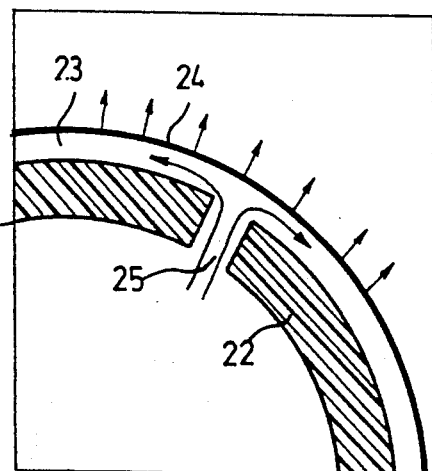
FIG. 6 shows an enlargement of the part A in FIG. 5.

In the second embodiment of the invention according to FIGS. 4 to 6, a tube 22 for feeding the fluidization gas, which tube is surrounded by a gas-permeable cloth 24 or the like, is disposed on the bottom of the conveying hose 21. The cloth 24 is tightly attached to the gas feeding tube 22 at regular intervals e.g. by means of clamps 26, whereby separate sections 23 are formed between the feeding tube 22 and the cloth 24, said sections being in connection with the feeding tube 22 through apertures 25 formed in the wall of said tube. The reference numeral 27 denotes a connecting stub, and 28 denotes a pipe for feeding the fluidization gas.

The invention is not restricted merely to the examples disclosed in the drawings but it can vary in its details within the scope of the following claims. Thus, the lining 2 does not have to be uniform in accordance with FIGS. 1 to 3, and the channels 3 can be partly embedded in the wall of the hose 1. Instead of wall channels 4, channels or tubes attached to the outer or inner surface of the hose 1 can be used. The number of the wall channels 4 can be other than three.

We claim:

1. Apparatus for transportation of a particle material, comprising a flexible hose (1) on the inside of which a gas-permeable lining (2) at least partly covering the inner surface of the hose (1) is disposed to fluidize the material to be transported, characterized in that the flexible hose (1) is a bulk article; that fluidization spaces (3) functioning independently of one another are formed between the hose (1) and the lining (2) in the longitudinal direction of the hose (1), said fluidization spaces (3) being divided into separate sections by means of transverse partition walls (6); and that channels (4) which extend in the longitudinal direction of the hose (1) and open into the separate sections of the fluidization spaces (3) through throttle apertures (5) are formed in the wall of the hose (1) for feeding gas into the different sections of the fluidization spaces (3).

* * * * *